(12) United States Patent
Mouroulis et al.

(10) Patent No.: US 12,299,024 B2
(45) Date of Patent: May 13, 2025

(54) UDSF RECORD RETRIEVAL AND DELETION

(71) Applicant: NOKIA TECHNOLOGIES OY, Espoo (FI)

(72) Inventors: Ioannis Mouroulis, Athens (GR); Ulrich Wiehe, Bad Hersfeld (DE); Jonathan Little, Stroud (GB); Vishal Gupta, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/882,202

(22) Filed: Aug. 5, 2022

(65) Prior Publication Data

US 2023/0044681 A1 Feb. 9, 2023

(30) Foreign Application Priority Data

Aug. 7, 2021 (IN) .............................. 202141035720

(51) Int. Cl.
*G06F 16/00* (2019.01)
*G06F 16/332* (2019.01)
*G06F 16/335* (2019.01)

(52) U.S. Cl.
CPC .......... *G06F 16/335* (2019.01); *G06F 16/332* (2019.01)

(58) Field of Classification Search
None
See application file for complete search history.

(56) References Cited

U.S. PATENT DOCUMENTS

| | | | | |
|---|---|---|---|---|
| 2004/0193512 | A1* | 9/2004 | Gobin | G06F 16/972 705/29 |
| 2015/0227631 | A1* | 8/2015 | Legrand | G06F 16/9535 707/722 |
| 2020/0077356 | A1* | 3/2020 | Youn | H04W 52/0209 |
| 2020/0367045 | A1* | 11/2020 | Jeong | H04W 76/22 |
| 2022/0022029 | A1* | 1/2022 | Di Girolamo | H04W 4/50 |
| 2023/0179669 | A1* | 6/2023 | Yang | H04L 41/40 709/201 |

FOREIGN PATENT DOCUMENTS

WO 2020103796 A1 5/2020

OTHER PUBLICATIONS

Author: ETSI. Title "5G, Unstructured data storage services (3GPP TS 29.598 version 16.1.0 Release 16)". Date: Jul. 2020. Publisher: ETSI. Edition or Volume: 3GPP TS 29.598 version 16.1.0 Release 16. Pertinent Pages: whole document as attached. (Year: 2020).*
Extended European Search Report dated Dec. 23, 2022, corresponding to European Patent Application No. 22188094.1.
Unknown: "searchRetrieve: Part 2. searchRetrieve Operation: APD Binding for SRU 1.2 Version 1.0", Jan. 30, 2013 (Jan. 30, 2013), pp. 1-34.

(Continued)

*Primary Examiner* — Anhtai V Tran
(74) *Attorney, Agent, or Firm* — Nokia Technologies Oy

(57) ABSTRACT

In a search or delete request towards a storage entity storing data in a plurality of records, an identifier list indicating identifiers associated with specific records to be processed is included, and the request including the identifier list is transmitted.

19 Claims, 13 Drawing Sheets

(56) References Cited

OTHER PUBLICATIONS

Nokia et al.: "Removal of paging parameters", 3GPP Draft; CP-210039, 3RD Generation Partnership Project (3GPP), Mobile Competence Centre ; 650, Route Des Lucioles ; F-06921 Sophia-Antipolis Cedex ; France vol. Ct WG4, No. E-Meeting; 20210224-20210305, Mar. 22, 2021 (Mar. 22, 2021).

3GPP TS 29.598 V17.2.0 (Jun. 2021), Technical Specification, 3rd Generation Partnership Project; Technical Specification Group Core Network and Terminals; 5G System; Unstructured Data Storage Services Stage 3; (Release 17), Jun. 2021.

3GPP TS 29.500 V17.2.0 (Mar. 2021), Technical Specification, 3rd Generation Partnership Project; Technical Specification Group Core Network and Terminals; 5G System; Technical Realization of Service Based Architecture; Stage 3 (Release 17), Mar. 2021.

* cited by examiner

| Name | Data type | P | Cardinality | Description | Applicability |
|---|---|---|---|---|---|
| supported-features | SupportedFeatures | O | 0..1 | see 3GPP TS 29.500 [4] clause 6.6 | |
| filter | SearchExpression | O | 0..1 | The filter criteria for searching the records of the storage. | |
| limit-range | Uinteger | C | 0..1 | When set, the returned response shall contain at the most the number of record references specified by the parameter value. If the count-indicator parameter is set in the request, this parameter shall be ignored. | |
| count-indicator | boolean | O | 0..1 | If this parameter is set, the number of records that matched the criteria shall be returned and no record references shall be returned. | |
| max-payload-size | integer | O | 0..1 | Maximum payload size (before compression, if any) of the response, expressed in kilo octets. When present, the UDSF shall limit the number of Records or Meta returned in the response so as not to exceed the maximum payload size indicated in the request. | |
| retrieve-records | boolean | O | 0..1 | If this parameter is set, the content of records that matched the criteria shall be returned. If count-indicator is set, this parameter shall not be set. | Combined SearchRetrieve |
| Callback | URI | O | 0..1 | If this parameter is set, the UDSF may send a non-committal 202 Accepted response and relay the final result of the operation via a subsequent Notification | AsynchronousBulkOperations |
| allResultsRequested | Boolean | O | 0..1 | This parameter must only be present if the callback parameter is also present. If the value of this parameter is true, all results of a search request must be sent (asynchronously), using multiple notifications if necessary, rather than sending only a subset of the results in a single notification. | AsynchronousBulkOperations |

Fig. 5

| Data type | Cardinality | Description | Applicability |
|---|---|---|---|
| SearchCondition | 1 | A search expression with logic operators | AdvancedQuery |
| SearchComparison | 1 | A minimum unit of the search expression | |
| RecordIdList | 1 | List of Record IDs to be retrieved | BulkOperations |

Fig. 6

| Attribute name | Data type | P | Cardinality | Description | Applicability |
|---|---|---|---|---|---|
| recordIdList | array(RecordId) | M | 1..N | List of Record IDs | |

Fig. 7

| Attribute name | Data type | P | Cardinality | Description | Applicability |
|---|---|---|---|---|---|
| count | Uinteger | M | 1 | The number of records found by the search. | |
| references | array(Uri) | O | 1..N | The Record references found by the search. | |
| supportedFeatures | SupportedFeatures | O | 0..1 | See clause 6.1.8 | |
| matchingRecords | map(Records) | C | 1..N | This attribute contains the records that match the search filters provided in the request. The key of the map is the record reference (a URI as included in the references attribute). It shall be present if the search request included an instruction to include record content in the response. The map may contain a subset of the matching records in the case where inclusion of more records would result in the payload size exceeding the max-payload-size received in the request (if any). | |

Fig. 8

| Name | Data type | P | Cardinality | Description | Applicability |
|---|---|---|---|---|---|
| supported-features | SupportedFeatures | O | 0..1 | see 3GPP TS 29.500 [4] clause 6.6 | |
| get-previous | boolean | O | 0..1 | Request to return the record content if a record exists in the targeted storage for the same record identifier. | |
| filter | SearchExpression | O | 0..1 | The filter criteria for searching the records of the storage. Note: get-previous shall be set to false when Filter is inlcuded | BulkOperations |

Fig. 12

UDSF RECORD RETRIEVAL AND DELETION

CROSS REFERENCE TO RELATED APPLICATION

This application claims the benefit of Indian Application No. 202141035720, filed Aug. 7, 2021. The entire content of the above-referenced application is hereby incorporated by reference.

TECHNICAL FIELD

At least some example embodiments relate to record retrieval and deletion for a UDSF (Unstructured Data Storage Function).

BACKGROUND

Specification 3GPP TS 29.598 regarding an API of a service "Nudsf_DataRepository" defines service operations and data structures that allow storage of and access to unstructured data in records in a UDSF by 5G core NFs. One operation supported by this specification is the search operation, which can be used to find all of the records that match filters supplied in the request. The UDSF responds to this request by returning a list of references (URIs) to the matching records.

LIST OF ABBREVIATIONS

3GPP Third Generation Partnership Project
5G Fifth Generation
5GC 5G Core Network
API Application Programming Interface
HTTP Hyper-Text Transfer Protocol
NF Network Function
NSSAI Network Slice Selection Assistance Information
SBI Service Based Interface
TS Technical Specification
UDSF Unstructured Data Storage Function
URI Uniform Resource Identifier

CITATION LIST

3GPP TS 29.598 v17.2.0 2021-06
3GPP TS 29.500 v17.2.0 2021-03

SUMMARY

At least some example embodiments aim at improving record retrieve and delete operations for a UDSF.

According to at least some example embodiments, apparatuses, methods and non-transitory computer-readable storage media are provided as specified by the appended claims.

According to at least some example embodiments, UDSF functionality is provided that optimizes computing resources in case of mass record retrieval/deletions by reducing signaling overhead. Hence, efficiency is improved.

Further, based on the UDSF functionality according to at least some example embodiments, an improved service is provided in which collisions are reduced by grouping multiple operations in batches.

In the following, comparative examples and example embodiments and example implementations will be described with reference to the accompanying drawings.

BRIEF DESCRIPTION OF THE DRAWINGS

FIG. 5 shows a table illustrating URI query parameters supported by a GET method on a resource "RecordCollection" according to at least some example embodiments.

FIG. 6 shows a table illustrating a definition of a type "SearchExpression" according to at least some example embodiments.

FIG. 7 shows a table illustrating a definition of a type "RecordIdList" according to at least some example embodiments.

FIG. 8 shows a table illustrating a definition of a type "RecordSearchResult" according to at least some example embodiments.

FIG. 12 shows a table illustrating URI query parameters supported by a DELETE method on a resource "RecordCollection" according to at least some example embodiments.

DESCRIPTION OF THE EMBODIMENTS

Before describing example embodiments and example implementations, comparative examples will be given.

UDSF consumers often need to perform parallel retrieval or deletion to a large number of stored records—in certain cases in the range of millions. Such scenarios are:

1. Retrieval of large number of records for which Record ID is already known e.g.
   a. Multiple Record URIs were received in a previous UDSF search operation, and a response included no, or only a subset of the relevant records.
   b. An incident that affects multiple records occurs and an NF consumer knows the impacted Record IDs but does not hold the actual record data to apply further actions.
2. Deletion of a large number of records, e.g. when resources are related to a certain peer NF and that NF is no longer operational.

Figure 1:
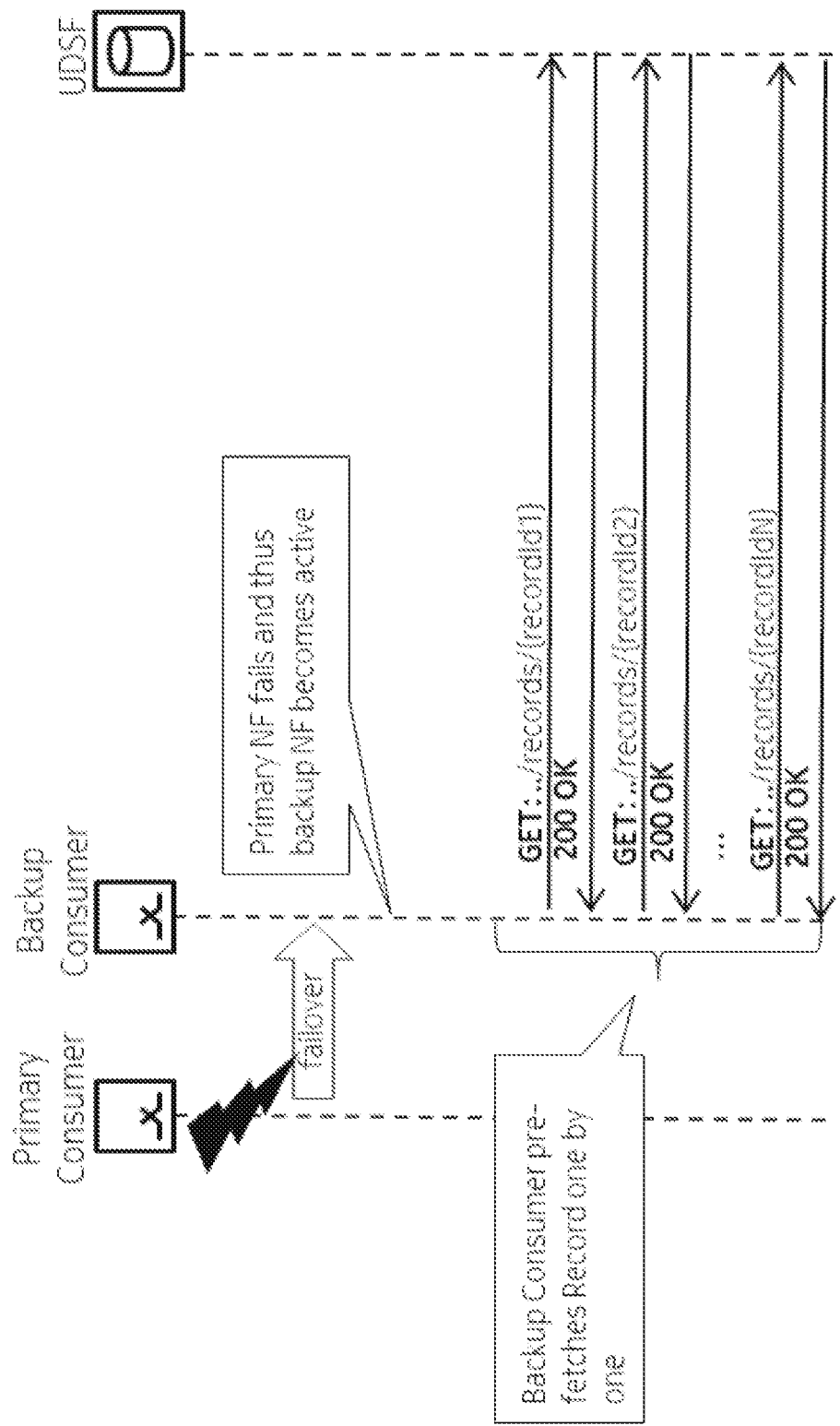
FIG. 1 shows a signaling diagram illustrating massive retrieval of records due to incident that affects multiple records according to a comparative example.
Figure 2:
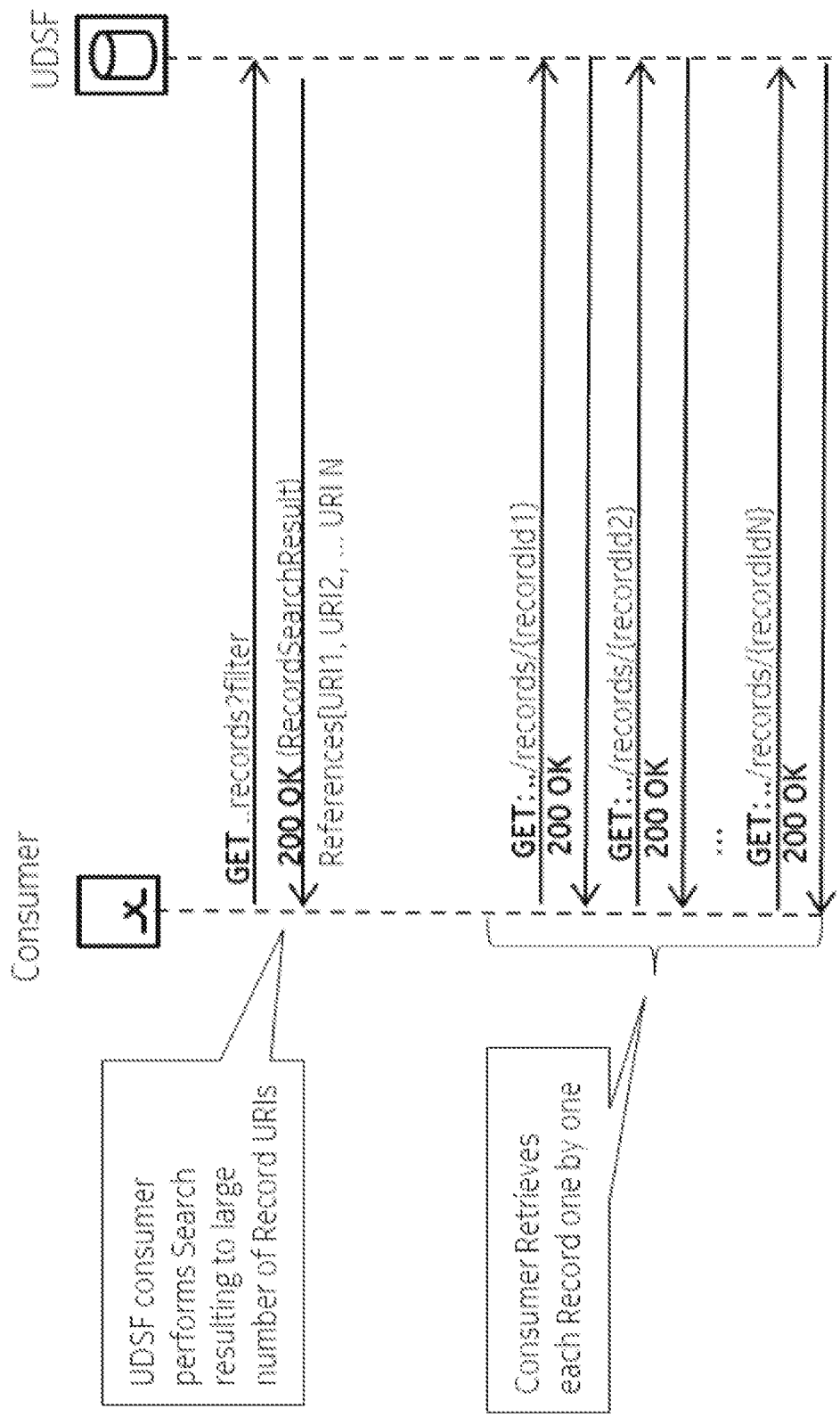
FIG. 2 shows a signaling diagram illustrating massive retrieval of records after a UDSF search operation according to a comparative example.
Figure 3:
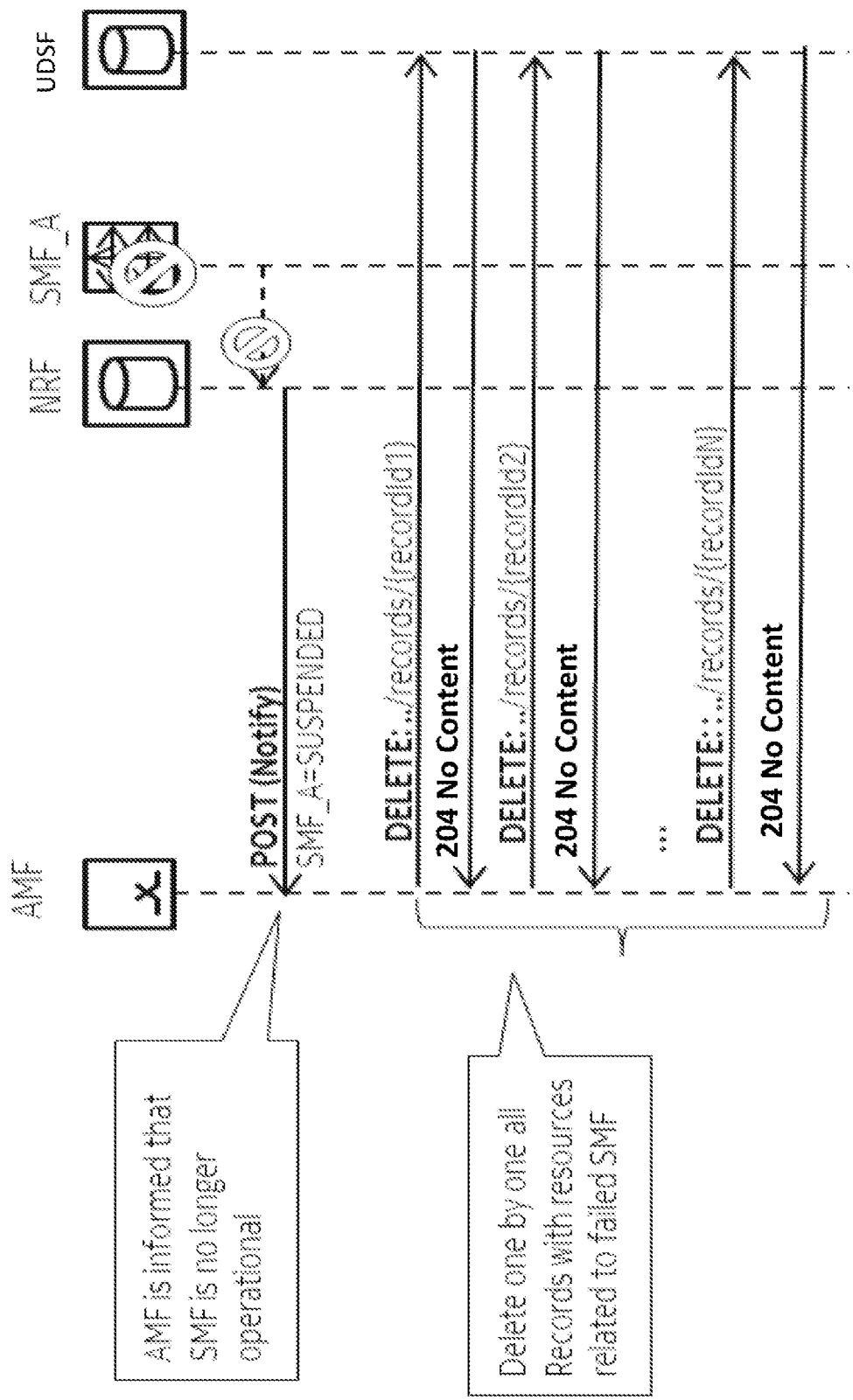
FIG. 3 shows a signaling diagram illustrating massive deletion of records of resources related to a failed remote peer according to a comparative example.

Example use cases are depicted in FIGS. 1 to 3 to be described below.

FIG. 1 shows a signaling diagram illustrating massive retrieval of records due to an incident that affects multiple records (according to above-mentioned scenario 1.b) according to a comparative example.

As shown in FIG. 1, assuming that a primary consumer of a UDSF (e.g. a primary NF) fails, a backup consumer (e.g. a backup NF) of the UDSF which knows the impacted Record IDs but does not hold the actual record data to apply further actions becomes active.

Using GET messages, the backup consumer pre-fetches records of Ids 1 to N one by one. The UDSF responds to the GET messages by messages 200 OK including the content of the records of Ids 1 to N.

FIG. 2 shows a signaling diagram illustrating massive retrieval of records after a UDSF search operation (according to above-mentioned scenario 1.a) according to a comparative example.

As shown in FIG. 2, a consumer of a UDSF first performs a search operation by sending a search request asking for all records matching filters in a message "GET: . . . records-?filter" to the UDSF.

In reaction to the search request, the UDSF sends a response containing a list of URIs (Record IDs) of all records matching the filters in a message "200 OK: (RecordSearchResult) References [URI 1, URI 2, . . . , URI N".

Then, for each RecordID, the consumer sends a read request asking for a content of a single record using a URI from the list in the previous response, using a message "GET: . . . /records/{recordId}.

In reaction to the read request, the UDSF sends a response containing the content of the requested record in a message 200 OK.

FIG. 3 shows a signaling diagram illustrating massive deletion of records of resources related to a failed remote peer (according to above-mentioned scenario 2) according to a comparative example.

As shown in FIG. 3, an NRF informs an AMF that SMF_A is no longer operational by sending a message "POST (Notify): SMF_A=Suspended".

In order to delete each record n of records 1 to N in a UDSF with resources related to the failed SMF_A, the AMF sends one by one messages "DELETE: . . . /records/{recordIdn}". The UDSF responds with messages "204 No Content".

In such cases as depicted in FIGS. 1 to 3, retrieving/updating the records from/in the UDSF one-by-one is not efficient leading to increased computing resource requirements and execution delays.

At least some example embodiments to be described in the following enhance the Nudsf_DataRepository service to support bulk retrieve and delete operation for record resources along with the option to make search operation asynchronous.

Figures 4A, 4B:
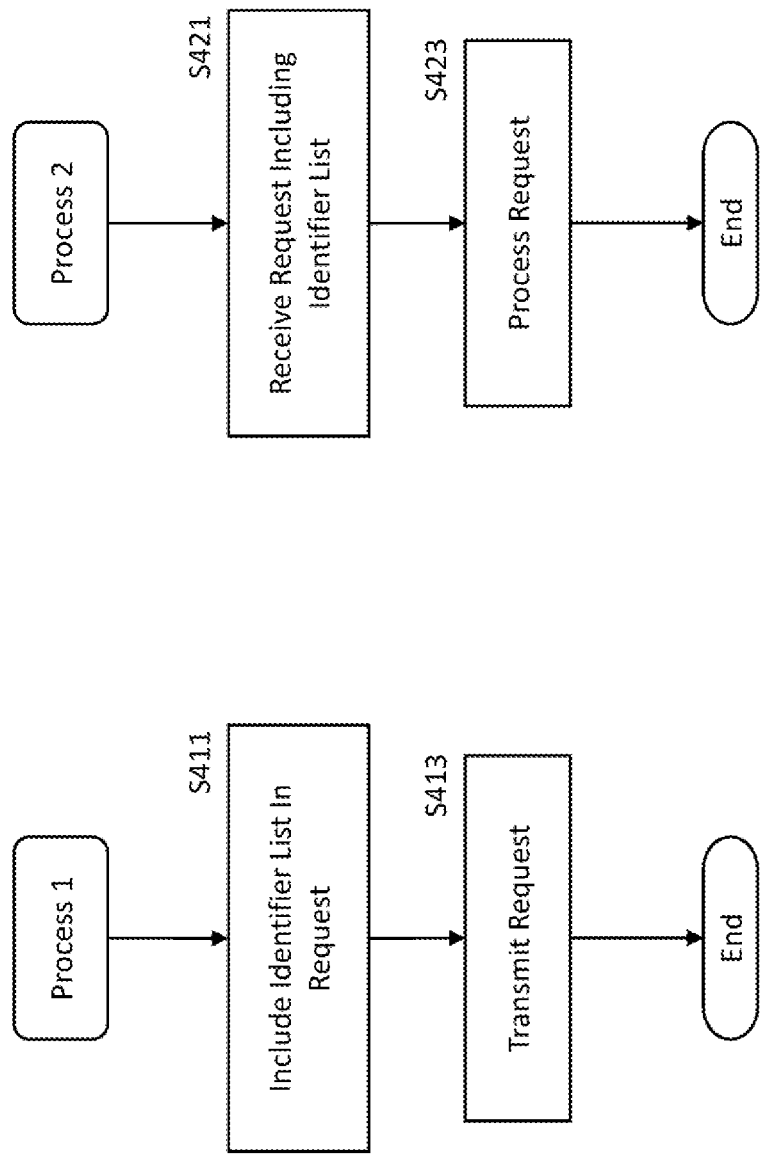
FIGS. 4A and 4B show flowcharts illustrating processes for bulk record retrieve and delete operations for a storage entity such as a UDSF according to at least some example embodiments.

Now reference is made to FIGS. 4A and 4B illustrating processes of for bulk record retrieve and delete operations for a storage entity such as a UDSF according to at least some example embodiments.

FIG. 4A illustrates a process 1 which is performed by a consumer of a storage entity storing data in records in a communication system. According to at least some example embodiments, the consumer comprises an NF and the storage entity comprises a UDSF.

According to at least some example embodiments, the communication system comprises a 5G core network, but is not limited thereto. At least some example embodiments are implementable in legacy communication networks or future communications networks as well.

For example, process 1 is started in case the consumer of the storage entity wants to search for records stored in the storage entity, e.g. in order to retrieve a content of one or more of the records, or wants to delete records stored in the storage entity.

In step S411, an identifier list is included in a request towards the storage entity, the identifier list indicating identifiers associated with specific records to be processed. Then, process 1 advances to step S413.

In step S413, the search request including the identifier list is sent to the storage entity. Then, process 1 ends.

According to at least some example embodiments, the request comprises a delete request, and the identifier list is included in the delete request in step S411 as a filter for searching the specific records based on the identifier list. In step S413, the delete request including the filter is transmitted.

According to an example implementation, the filter is a URI query parameter added to URI query parameters supported by the DELETE method on the resource "RecordCollection".

According to an example implementation, the filter is of a data type "SearchExpression" which comprises a data type "RecordIdList".

Details of a Nudsf_DataRepository delete operation, associated with the delete request, according to at least some example embodiments will be described with reference to FIGS. 5 to 13.

According to at least some example embodiments, the request comprises a search request. In step S411, in the search request, a first indication and the identifier list indicating the identifiers associated with the specific records are included, wherein the specific records are to be retrieved from the storage entity. The first indication indicates that, along with a reference list indicating references to retrieved records of the specific records which have been retrieved based on the identifier list, a content of the retrieved records is to be received in a response with respect to the search request.

For example, the reference list is implemented by an attribute "references" in a type "RecordSearchResult". According to at least some example implementation, the content is implemented by an attribute "matchingRecords" in the RecordSearchResult.

In step S413, the search request including the identifier list and the first indication is transmitted.

For example, the first indication is a URI query parameter "retrieve-records" which is supported by the GET method on a resource "Record Collection".

According to an example implementation, the identifier list is included in a URI query parameter "filter" which is supported by the GET method on the resource "RecordCollection". According to an example implementation, the identifier list and the first indication are included in the URI query parameter "filter".

According to an example implementation, the filter is of a data type "SearchExpression" which comprises a data type "RecordIdList".

According to at least some example embodiments, in step S411, information about a certain payload size of the response is set in the search request. For example, this information is a URI query parameter "max-payload-size" which is supported by the GET method on the resource "Record Collection".

According to at least some example embodiments, in step S411, a second indication is included in the search request, the second indication indicating that the response with respect to the search request is to be a search result notification according to an asynchronous communication.

According to at least some example embodiments, the second indication comprises a callback indicator to be used for sending the search result notification.

According to an example implementation, the callback indicator is a URI query parameter "callback" added to the URI query parameters supported by the GET method on the resource "RecordCollection".

According to at least some example embodiments, in step S411, a third indication is included in the search request, the third indication indicating that the response with respect to the search request may be multiple search result notifications according to an asynchronous communication in which the entire search results are contained (e.g., in which the content of the retrieved records is contained entirely).

According to at least some example embodiments, the third indication comprises a flag to be used for indicating that the entire content of the search results may be sent asynchronously, split over multiple notifications if necessary.

According to an example implementation, the callback indicator is a boolean parameter "allResultsRequested" added to the URI query parameters supported by the GET method on the resource "Record Collection".

Details of the Nudsf_DataRepository search operation, associated with the search request, according to at least some example embodiments will be described with reference to FIGS. 5 to 13.

FIG. 4B illustrates a process 2 which is performed by a storage entity storing data, e.g. unstructured data, in records in a communication system.

According to at least some example embodiments, the communication system comprises a 5G core network, but is not limited thereto. At least some example embodiments are implementable in legacy communication networks or future communications networks as well.

For example, process 2 is started in case the storage entity receives a search request or a delete request from a consumer of the storage entity.

In step S421, a request including an identifier list indicating identifiers associated with specific records is received.

Then, process 2 advances to step S423.

In step S423, the request is processed based on the identifier list and the plurality of records stored by the storage entity. Then process 2 ends.

According to at least some example embodiments, in case the request is a delete request, in step S423, from the plurality of records, records are searched whose references match the identifiers indicated in the identifier list using the identifier list as a filter for searching the specific records in the plurality of records, and the searched specific records are deleted from the plurality of records.

According to an example implementation, the filter is a URI query parameter added to URI query parameters supported by the DELETE method on the resource "RecordCollection".

According to an example implementation, the filter is of a data type "SearchExpression" which comprises a data type "RecordIdList".

Details of the Nudsf_DataRepository delete operation, associated with the delete request, according to at least some example embodiments will be described with reference to FIGS. 5 to 13.

According to at least some example embodiments, in case the request is a search request, in step S423, in a response with respect to the search request, a reference list indicating the references to the retrieved records is included. Further, based on a first indication included in the search request with respect to including, into the response, a content of the specific records along with the reference list, the content or a subset of the content is included in the response. Then, the response including the reference list and the content or the subset of the content is transmitted.

As described above with respect to FIG. 4A, according to an example implementation, the identifier list is included in a URI query parameter "filter" which is supported by the GET method on the resource "Record Collection".

According to an example implementation, an attribute "matchingRecords" included in a definition of a type "RecordSearchResult" (as described above with respect to FIG. 4A) contains the content or the subset of the content of the one or more retrieved records.

Further, for example, as described above, the reference list is included in an attribute "references" of the definition of the type "Record Search Result".

According to at least some example embodiments, in step S423, in case of several retrieved records, the content to be included into the response is limited to a number of the retrieved records that does not exceed a certain payload size. For example, information about the certain payload size is acquired from the search request in step S423.

According to at least some example embodiments, the search request includes a second indication indicating that the response with respect to the search request is to be a search result notification according to an asynchronous communication.

In case of the asynchronous communication, in step S423, a notification message is prepared as the response, the notification message including the reference list and the content or the subset of the content. In response to the search request, an acknowledgement of the search request is transmitted, and the notification message is transmitted separately.

Alternatively, in case the search request includes the second indication, the response including the reference list and the content or the subset of the content is transmitted as acknowledgment of the search request.

According to at least some example embodiments, the second indication comprises a callback indicator and the notification message is transmitted to the callback indicator.

As described above, according to an example implementation, the callback indicator is a URI query parameter "callback" added to the URI query parameters supported by the GET method on the resource "Record Collection".

According to at least some example embodiments, in step S423, in case the search request includes a third indication indicating that the response with respect to the search request may be multiple search result notifications according to an asynchronous communication in which the entire search results are contained, one or more notification messages including the reference list and the content or the subset of the content are prepared. In response to the search request, an acknowledgement of the search request is transmitted, and the one or more notification messages are transmitted separately.

According to at least some example embodiments, the third indication comprises a flag to be used for indicating that the entire content of the search results may be sent asynchronously, split over multiple notifications if necessary.

According to an example implementation, the callback indicator is a boolean parameter "allResultsRequested" added to the URI query parameters supported by the GET method on the resource "Record Collection".

Details of the Nudsf_DataRepository search operation, associated with the search request, according to at least some example embodiments will be described with reference to FIGS. 5 to 13.

According to at least some example embodiments, the Nudsf_DataRepository service is enhanced to support bulk retrieve and delete operations for record resources along with the option to make search operation asynchronous.

As described above, according to at least some example embodiments, this is achieved by the following RecordCollection resource operations:

Search Operation
    Search Filter: SearchExpression data type is extended to support a list of record IDs (also referred to as "identifier list" in this application) along with the option to implement the search operation asynchronously. This is achieved by optionally providing a callback URI (also referred to as "callback identifier" in this application) in the request which the UDSF can use to accordingly notify the consumer with the outcome of operation via the introduced Search Result Notify operation (also referred to as "notification message" in this application).

According to at least some example embodiments, the request optionally includes also an indicator to indicate that the entire set of search results may be sent using multiple Search Result Notify operations if necessary, rather than sending a single Search Result Notify operation containing a subset of the Search Results.

Delete Operation
    A filter is added as a query parameter. The filter uses the same SearchExpression data type as the one used for the search operation including the extension to support a list of record IDs.

In the following, details on the search operation and delete operation according to at least some example embodiments and example implementation will be described with reference to FIGS. 5 to 13.

Nudsf DataRepository Search Operation

The URI query parameters for the search operation are defined in TS 29.598 section 6.1.3.2.3.1. According to at least some example embodiments, the URI query parameters supported by the GET method on the RecordCollection resource are extended as shown in the table illustrated in FIG. 5.

As shown in FIG. 5, the URI query parameters for the search operation are extended by an indication "retrieve-records", an optional max-payload-size limit, an extended SearchExpression structure, an optional callback URI, and an optional indication "allResultsRequested".

The parameter "retrieve-records" is of Boolean data type, is an optional parameter, has a cardinality of 0 . . . 1, and its applicability is a combined search and retrieve operation. If this parameter is set, the content of records that matched the filter criteria included in the search request, or a subset thereof, have to be returned. If parameter "count-indicator" is set, this parameter is not be set.

Further, the parameter "max-payload-size" is of data type "integer", is an optional parameter, has a cardinality of 0 . . . 1, and its applicability is the combined search and retrieve operation. This parameter indicates a payload size (before compression, if any) of the response, e.g. expressed in kilo octets. When this parameter is present, the UDSF limits the content of the matching records returned in the response so as not to exceed the payload size indicated in the search request.

The parameter "callback" is of data type "URI", is an optional parameter, has a cardinality of 0 . . . 1, and its applicability are asynchronous bulk operations. If this parameter is set, the UDSF shall send a non-committal 202 Accepted response and relay the final result of the operation via a subsequent notification.

The parameter "allResultsRequested" is of data type "boolean", is an optional parameter, has a cardinality of 0 . . . 1, and its applicability is asynchronous bulk operations. If this parameter is set, the UDSF shall send a non-committal 202 Accepted response and relay the entire set of search results via subsequent notifications, if the results cannot be transferred in a single notification due to limitations on payload size. This parameter may be included only if "callbackUri" is also included.

The SearchExpression data type is extended as shown in the table illustrated in FIG. 6 which defines the data type "SearchExpression" as a list of mutually exclusive alternatives.

As shown in FIG. 6, the data types are extended by "RecordIdList" which has a cardinality of 1, is applicable to bulk operations, and describes a list of record IDs to be retrieved. The list of record IDs to be retrieved are also referred to as identifier list in this application.

FIG. 7 shows a table illustrating a definition of attribute "RecordIdList" according to at least some example embodiments. The attribute "RecordIdList" is of data type "array (RecordId)", is a mandatory parameter, and has a cardinality of 1 . . . N.

According to at least some example embodiments, in case the search request does not include a callback URI, the response is sent within a message "200 OK" including a RecordSearchResult.

If the search request includes a callback URI, the Producer (UDSF) has the option to either provide a 200 OK response with the content as described above or respond with "202 Accepted" and no content body. In the latter case the RecordSearchResult is sent in a subsequent notification or notifications.

According to at least some example embodiments, a data type "RecordSearchResult" contained in the response message for the search operation is extended to allow conditional inclusion of an attribute that is used to contain the content of the retrieved records.

As illustrated in FIG. 8, according to an example implementation, the attribute "matchingRecords" is included in a definition of a type "RecordSearchResult". This attribute is of data type "map(records)", is a conditional attribute, and has a cardinality of 1 . . . N. This attribute contains the records that match the search filters provided in the search request. The key of the map is the record Id. The attribute "matchingRecords" is present if the search request included an instruction to include content of retrieved records in the response. For example, the map contains a subset of the content of the retrieved records in the case where inclusion of more records would result in the payload size exceeding the "max-payload-size" received in the search request (if any).

According to at least some example embodiments, the bulk retrieval operation is achieved with a reduced number of messages compared to the comparative examples as will be described below with reference to FIGS. 9 and 10.

Figure 9:
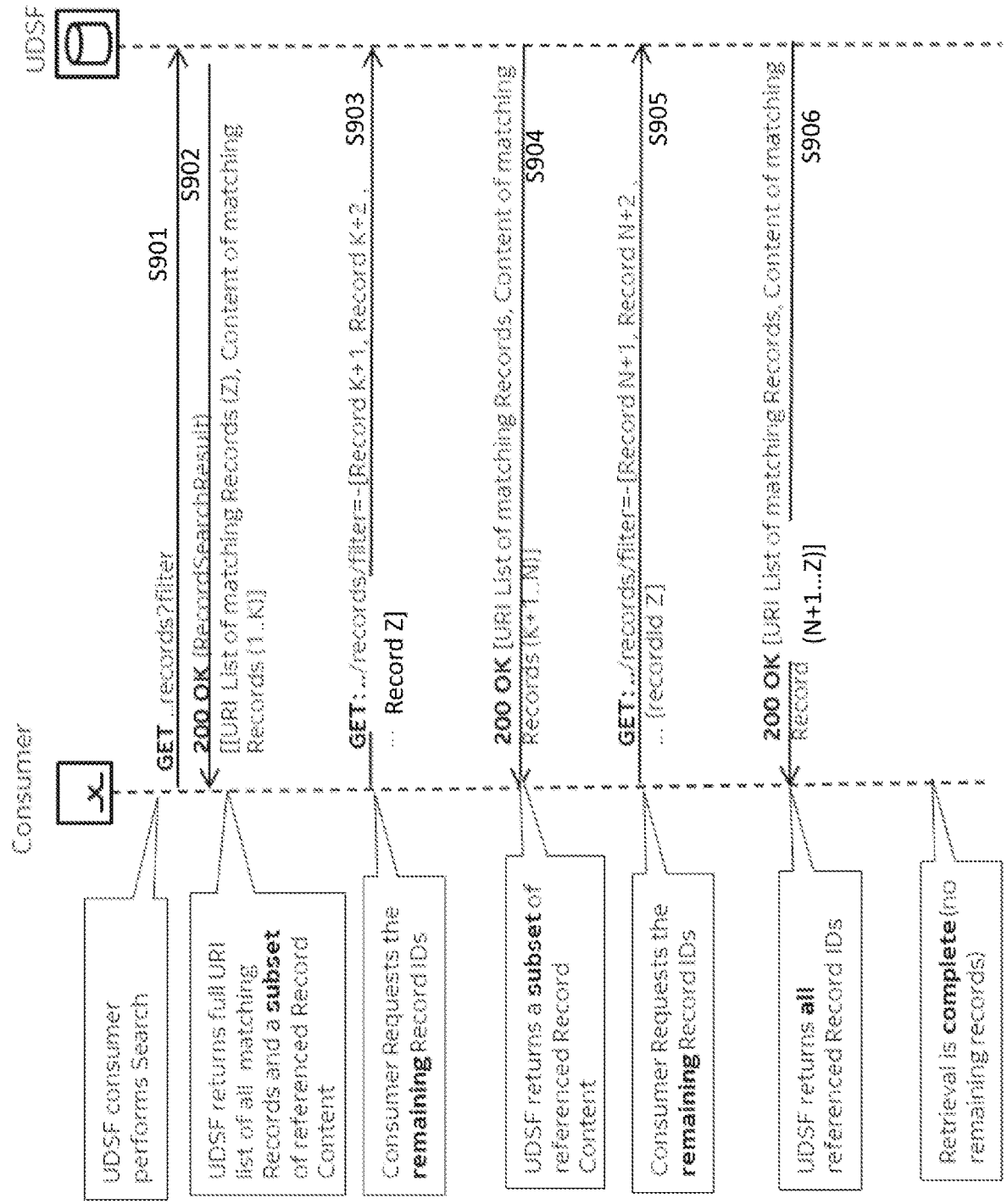
FIG. 9 shows a signaling diagram illustrating bulk retrieval of records in multiple steps with synchronous communication according to at least some example embodiments.
Figure 10:
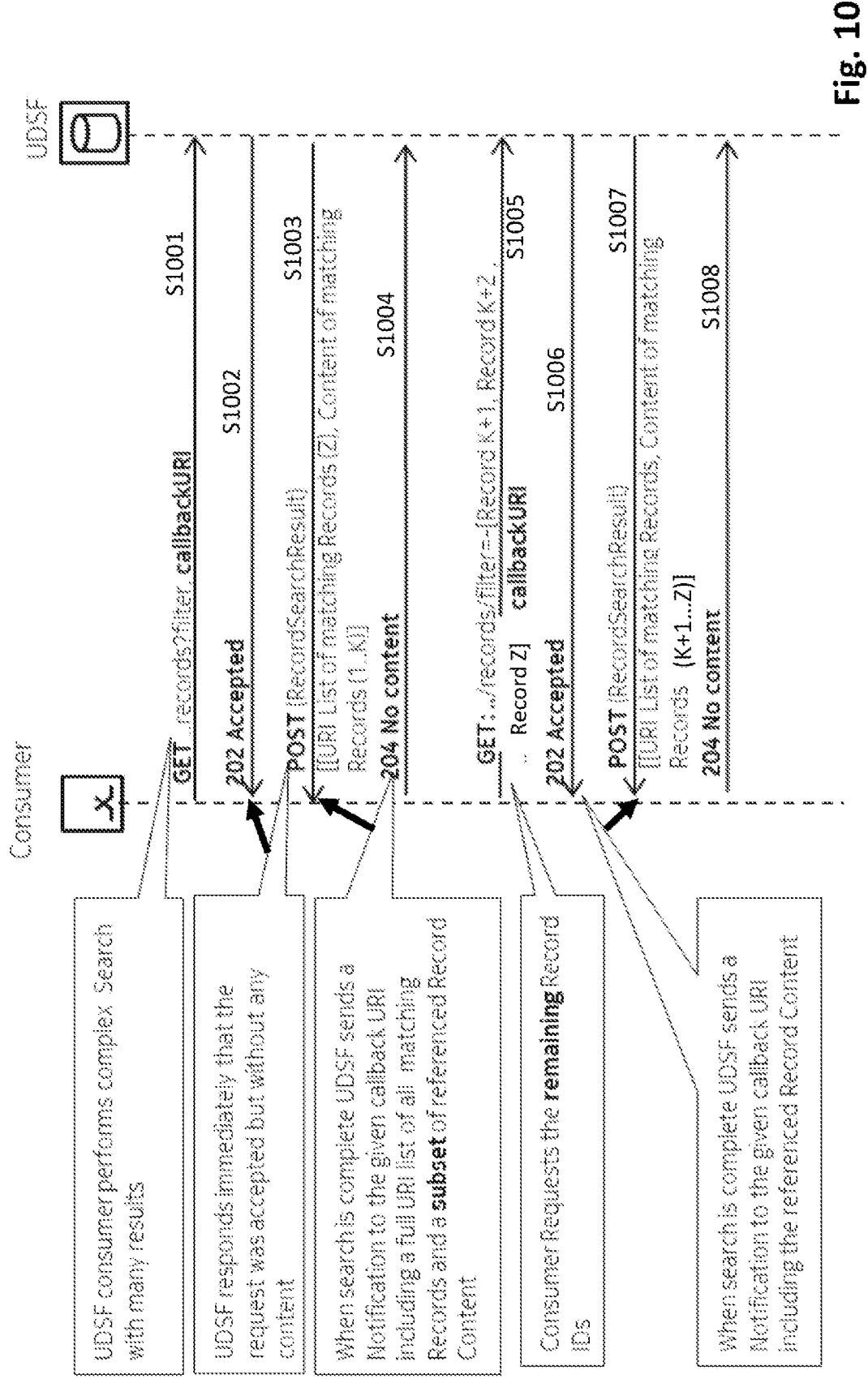
FIG. 10 shows a signaling diagram illustrating bulk retrieval of records in multiple steps with asynchronous communication according to at least some example embodiments.

In an optional first step which is not illustrated in FIGS. 9 and 10, for performing the bulk retrieval of records, a UDSF consumer performs a search query with filter parameters as illustrated in FIG. 2. The UDSF responds with a list of Record URIs, e.g. a reference list.

In a next step, the UDSF consumer issues a search request including as query parameters
- the list of the Record IDs to be retrieved, e.g. the identifier list;
- an indication that records that are found shall be returned, e.g. the first indication;
- optionally, the maximum payload size of the response;
- optionally, a callback URI; and
- optionally, an indication that all results shall be sent, using multiple notifications if necessary.

The callback URI is included in case the Consumer is willing to receive the response via an asynchronous communication.

For example, the identifier list is deduced by the search query in the previous step, or is a list of Record IDs the consumer has deduced with other means.

Referring to FIG. 9, in step S901, the consumer transmits a search request "GET . . . records?filter" to the UDSF.

Referring to FIG. 10, in step S1001, the consumer transmits a search request "GET . . . records?filter", callbackURI to the UDSF.

The UDSF response depends if synchronous or asynchronous communication is used.

In case of synchronous communication illustrated in FIG. 9, in step S902, the UDSF responds with a 200 OK including the RecordSearchResult.

In case of asynchronous communication illustrated in FIG. 10, in step S1002, the UDSF immediately responds with 202 Accepted and sends a notification request (POST) with the RecordSearchResult in step S1003 when the search operation is complete.

In both cases, the RecordSearchResult is the following:
The "references" attribute includes the URIs for all existing record IDs, i.e. the record IDs found from the plurality of records stored by the UDSF based on the identifier list. It is noted that absence of an identifier associated with a specific record to be retrieved in the response indicates to the consumer that the identifier (the record ID) is not existent in the UDSF and the consumer should not include it in subsequent requests.
The "matchingRecords" attribute includes the subset of records that can be added without exceeding the maximum payload size of the response.

In a further step of the bulk retrieval operation, if the content of the RecordSearchResult is not complete (i.e. the records included in the "matchingRecords" attribute are a subset of the record URIs in the "references" attribute), the consumer issues a subsequent search request including a list with all the record IDs (identifiers associated with the records) that have not yet been retrieved.

According to at least some example embodiments, based on the reference list and the content included in the response, it is decided whether or not a condition that a content of each of the records whose reference is indicated in the reference list has been received with the response is met. In case the condition is not met, in a further search request, the first indication and an identifier list indicating identifiers associated with records of the specific records, whose references are included in the reference list of the response but whose identifiers are not included in the content of the response, are included, and the further search request is transmitted.

Referring to FIG. 9, in step S902 the consumer receives content of matching records 1 to K. However, according to the reference list "URI list of matching records (Z)" there is a number Z of records found based on the search request issued in step S901, and K is smaller than Z. Hence, in step S903 the consumer issues a further search request including an identifier list of identifiers K+1 to Z.

Similarly, in step S1005 of FIG. 10, the consumer issues a further search request including an identifier list of identifiers K+1 to Z and a callback URI.

This step is repeated until a response is complete, i.e. the records included in the matchingRecords attribute are equal of the record URIs in the references attribute.

As shown in FIG. 9, in step S904 the consumer receives content of matching records K+1 to N. However, since the URI list of matching records is not equal to the content of matching records, in step S905 the consumer issues a still further search request including an identifier list of identifiers N+1 to Z. In step S906, the consumer receives the requested records N+1 to Z.

In FIG. 10, in reaction to the further search request issued in step S1005 the consumer receives the requested records in step S1007.

According to an alternative example implementation, in case of asynchronous communication and in case the search request includes the indication "allResultsRequested", the UDSF sends multiple notification messages until the response is complete. The consumer responds to each of the notification messages received by the consumer with a message "204 No Content".

Notification of a Search Result for Asynchronous Bulk Search Operation

According to at least some example embodiments, the consumer implicitly creates a subscription when issuing a search request that includes a callback URI. In that case the UDSF responds with 202 Accepted to the search request (cf. steps S1002 and S1006 of FIG. 10) and subsequently sends a search result notification (cf. steps S1003 and S1007 of FIG. 10) when the search operation is complete.

Figure 11:
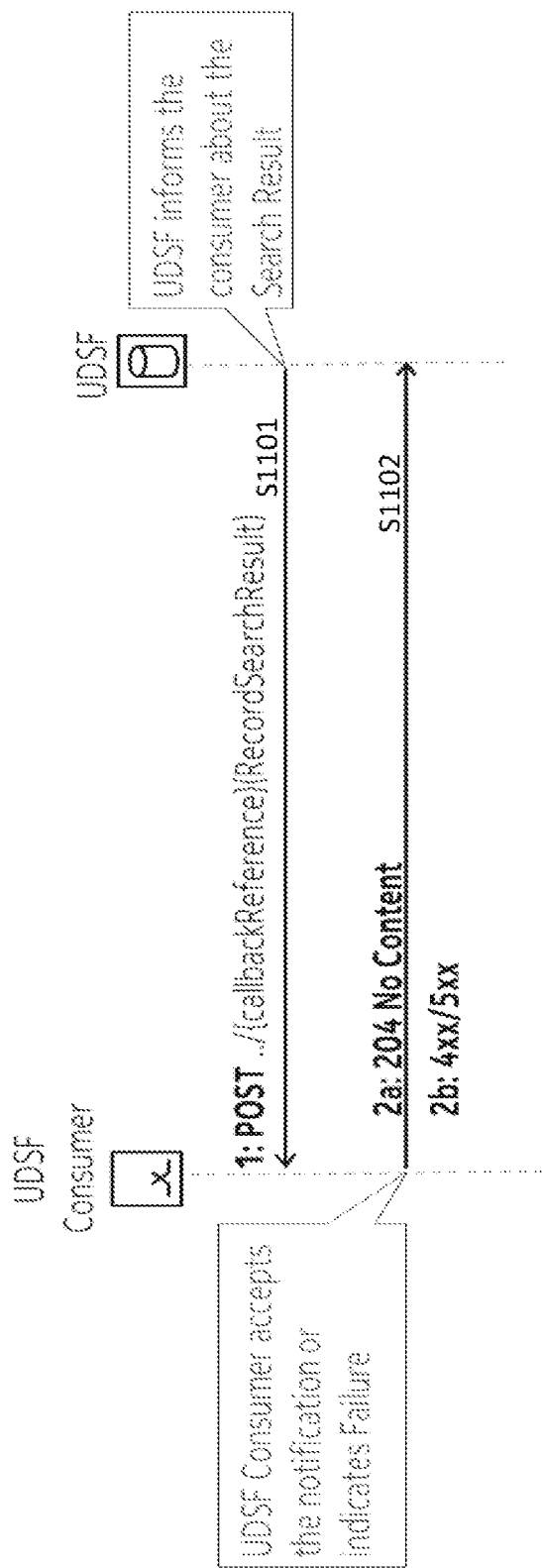
FIG. 11 shows a signaling diagram illustrating notification of a search result for asynchronous operation according to at least some example embodiments.

FIG. 11 illustrates a notification of a search result for asynchronous operation according to at least some example embodiments.

As shown in FIG. 11, in step S1101, the UDSF sends a POST request (also referred to as "notification message" in this application) to the callback URI. The request contains the RecordSearchResult.

On success, in step S1102 "204 No Content" will be returned by the consumer (cf. steps S1004 and S1008 of FIG. 10).

On failure, in step S1102 an appropriate HTTP status code indicating the error shall be returned and appropriate additional error information should be returned in the POST response body.

Nudsf DataRepository Delete Operation

The URI query parameters for the delete operation are defined in TS 29.598 section 6.1.3.3.3.3. According to at least some example embodiments, these parameters are extended as illustrated by the table shown in FIG. 12.

As shown in FIG. 12, the URI query parameters supported by the DELETE method on the resource "RecordCollection" are extended with a parameter "filter" which is of data type "SearchExpression", is an optional parameter, has a cardinality of 0 . . . 1, and is applicable to bulk operations. The parameter "filter" describes filter criteria for searching the records of the storage entity, e.g. the UDSF. It is noted that the parameter "get-previous" shall be set to false when the parameter "filter" is included in the delete request.

Figure 13:
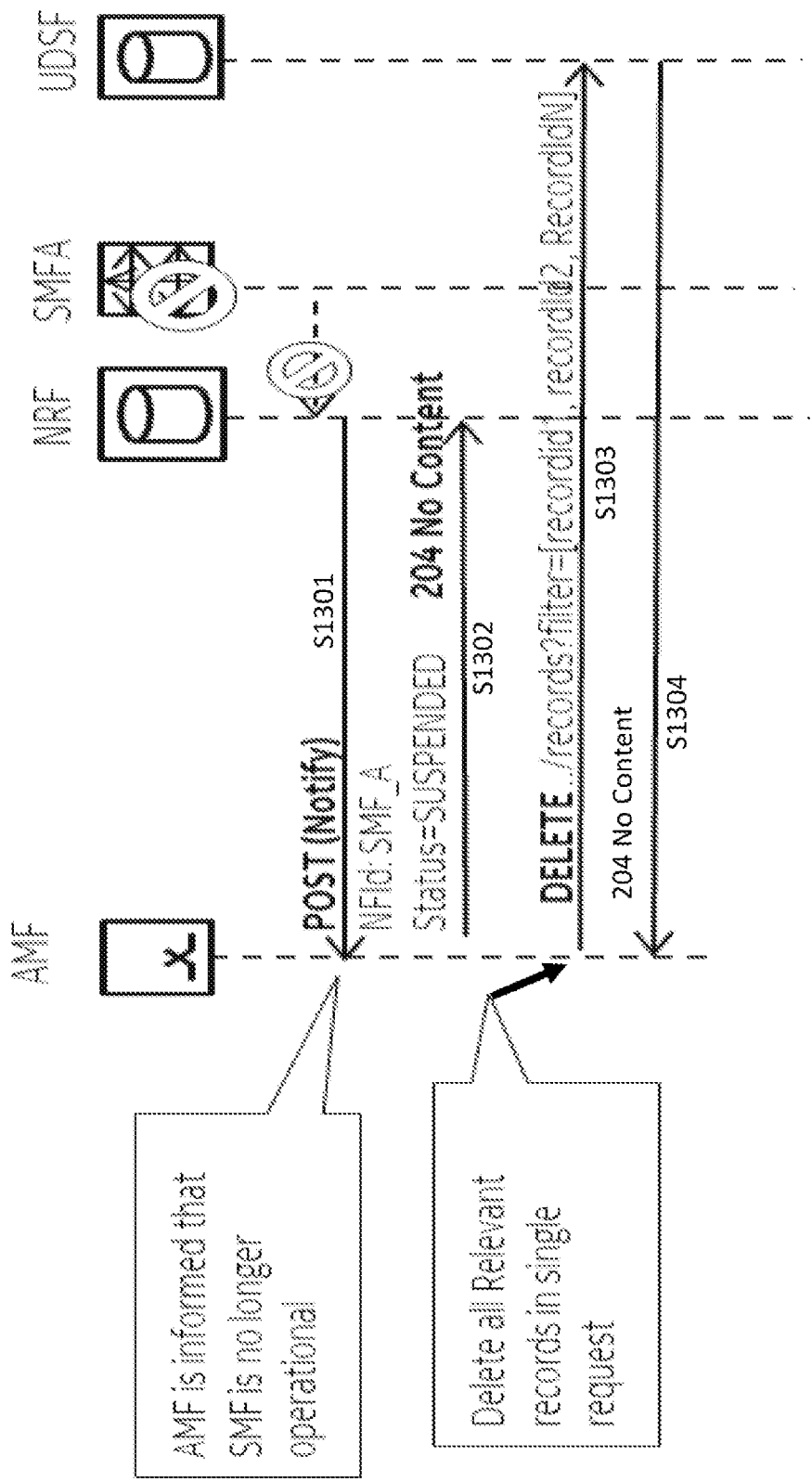
FIG. 13 shows a signaling diagram illustrating bulk deletion of records according to at least some example embodiments.

FIG. 13 illustrates a signaling diagram illustrating bulk deletion of records according to at least some example embodiments.

In step S1301, an AMF is informed that an SMF is no longer operational in a message "POST(Notify) NFId: SMF_A, Status=Suspended). The AMF responds with a message "204 No Content" in step S1302.

In step S1303, the AMF sends a delete message to the UDSF, comprising as filter an identifier list of identifiers associated with records of IDs 1 to N, which the AMF wants to delete from the UDSF. In step S1304, the UDSF responds with message "204 No Content".

Hence, all relevant records can be deleted in a single request.

It is to be noted that the UDSF consumer is able to discover whether the UDSF can support the functionality described above via supported features negotiation mechanism (as defined in chapter 6.6.2 of 3GPP TS 29.500).

Further, it is noted that although the UDSF functionality is described as being implemented as an extension to existing Nudsf_DataRepository service operations according to some of the above-described example embodiments, it is also possible to implement the UDSF functionality as new operations of the same service.

Figure 14:
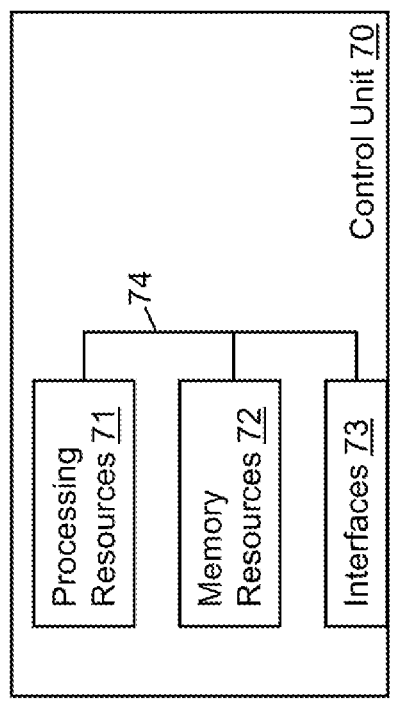
FIG. 14 shows a schematic block diagram illustrating a configuration of a control unit in which at least some example embodiments are implementable.

Now reference is made to FIG. 14 illustrating a simplified block diagram of a control unit 70 that is suitable for use in practicing at least some example embodiments. According to an example implementation, process 1 of FIG. 4A is implemented by the control unit 70. Alternatively or in addition, according to an example implementation, process 2 of FIG. 4B is implemented by the control unit 70.

According to an example implementation, control units respectively corresponding to the control unit 70 are provided for the processes 1 and 2, respectively.

The control unit 70 comprises processing resources (e.g. processing circuitry) 71, memory resources (e.g. memory circuitry) 72 and interfaces (e.g. interface circuitry) 73, which are coupled via a wired or wireless connection 74.

According to an example implementation, the processing resources 71, memory resources 72 and interfaces 73 implement a processor and a transceiver.

According to an example implementation, the memory resources 72 are of any type suitable to the local technical environment and are implemented using any suitable data storage technology, such as semiconductor based memory devices, magnetic memory devices and systems, optical memory devices and systems, fixed memory and removable memory. The processing resources 71 are of any type suitable to the local technical environment, and include one or more of general purpose computers, special purpose computers, microprocessors, digital signal processors (DSPs) and processors based on a multi core processor architecture, as non-limiting examples.

According to an implementation example, the memory resources 72 comprise one or more non-transitory computer-readable storage media which store one or more programs that when executed by the processing resources 71 cause the control unit 70 to function as a consumer of a storage entity as described above.

Alternatively or in addition, according to an implementation example, the memory resources 72 comprise one or more non-transitory computer-readable storage media which store one or more programs that when executed by the processing resources 71 cause the control unit 70 to function as a storage entity (e.g. UDSF) as described above.

According to an example implementation, control units respectively corresponding to the control unit 70 are provided for the consumer and the storage entity, respectively.

Further, as used in this application, the term "circuitry" refers to one or more or all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

According to at least some example embodiments, an apparatus for use in a communication system is provided, the apparatus comprising:
means for including, in a request towards a storage entity storing data in a plurality of records, an identifier list indicating identifiers associated with specific records to be processed; and
means for transmitting the request including the identifier list.

According to at least some example embodiments,
the request comprises a delete request,
the identifier list is included in the delete request as a filter for searching the specific records based on the identifier list, and
the delete request including the filter is transmitted.

According to at least some example embodiments,
the request comprises a search request,
in the search request, a first indication and the identifier list indicating the identifiers associated with the specific records which are to be retrieved from the storage entity are included,
the first indication indicates that, along with a reference list indicating references to retrieved records of the specific records which have been retrieved based on the identifier list, a content of the retrieved records is to be received in a response with respect to the search request, and
the search request including the identifier list and the first indication is transmitted.

According to at least some example embodiments, the search request serves to retrieve, from the storage entity, records that match a filter, and the identifier list and the first indication are included as the filter.

According to at least some example embodiments, the apparatus further comprises means for setting, in the search request, information about a certain payload size of the response.

According to at least some example embodiments, the apparatus further comprises means for including a second indication in the search request, the second indication indicating that the response with respect to the search request is to be a search result notification according to an asynchronous communication.

According to at least some example embodiments, the second indication comprises a callback indicator to be used for sending the search result notification.

According to at least some example embodiments, the apparatus further comprises means for including a third indication in the search request, the third indication indicating that the response with respect to the search request may be multiple search result notifications according to the asynchronous communication in which the content of the retrieved records is contained entirely.

According to at least some example embodiments, the apparatus further comprises means for receiving the response with respect to the search request;

means for deciding, based on the reference list and the content included in the response, whether or not a condition that a content of each of the records whose reference is indicated in the reference list has been received with the response is met;

means for, in case the condition is not met, including, in a further search request, the first indication and an identifier list indicating identifiers associated with records of the specific records, whose references are included in the reference list of the response but whose identifiers are not included in the content of the response; and means for transmitting the further search request.

According to at least some example embodiments, the apparatus further comprises means for receiving a further response with respect to the further search request;

means for deciding, based on the reference list and the content included in the further response and based on the identifiers associated with the retrieved records whose content has been included in the response to the search request which is a previous search request to the further search request, whether or not the condition is met;

means for, in case the condition is not met, including, in a still further search request, the first indication and an identifier list indicating identifiers associated with records of the specific records, whose references are included in the reference list of the further response but whose identifiers are not included in the content of the further response and which have not been received in the response associated with the previous search request;

means for transmitting the still further search request; and means for repeating the deciding and including until the condition is met.

According to at least some example embodiments, the apparatus further comprises means for refraining from including, in the identifier list of the further search request, an identifier associated with a specific record which is not indicated in the reference list of the response.

According to at least some example embodiments, an apparatus for use by a communication system is provided, wherein the apparatus comprises storing means for storing data in a plurality of records, the apparatus further comprising:

means for receiving a request including an identifier list indicating identifiers associated with specific records; and means for processing the request based on the identifier list and the plurality of records.

According to at least some example embodiments, the request comprises a delete request, and the apparatus further comprises means for searching, from the plurality of records, records whose references match the identifiers indicated in the identifier list using the identifier list as a filter for searching the specific records in the plurality of records, and means for deleting the searched specific records from the plurality of records.

According to at least some example embodiments, the request comprises a search request, and the apparatus further comprises means for retrieving, from the plurality of records, records whose references match the identifiers indicated in the identifier list, means for including, in a response with respect to the search request, a reference list indicating the references to the retrieved records, means for, based on a first indication included in the search request with respect to including, into the response, a content of the specific records along with the reference list, including the content or a subset of the content in the response; and means for transmitting the response including the reference list and the content or the subset of the content.

According to at least some example embodiments, in case of several retrieved records, the content to be included into the response is limited to a number of the retrieved records that does not exceed a certain payload size.

According to at least some example embodiments, the apparatus further comprises means for acquiring information about the certain payload size from the search request.

According to at least some example embodiments, the apparatus further comprises in case the search request includes a second indication indicating that the response with respect to the search request is to be a search result notification according to an asynchronous communication, means for preparing a notification message as the response, the notification message including the reference list and the content or the subset of the content, means for transmitting an acknowledgement of the search request and means for transmitting the notification message, or means for preparing the response as acknowledgment of the search request.

According to at least some example embodiments, the second indication comprises a callback indicator and the notification message is transmitted to the callback indicator.

According to at least some example embodiments, in case the search request includes the second indication and a third indication indicating that the response with respect to the search request may be multiple search result notification, and in case a number of retrieved records exceeds a certain payload size, several notification messages including the reference list and the subset of the content are provided, and the several notification messages are transmitted.

Further examples are disclosed below:

Example 1. An apparatus for use in a communication system, the apparatus comprising: a processor configured to include, in a request towards a storage entity storing data in a plurality of records, an identifier list indicating identifiers associated with specific records to be processed; and a transceiver configured to transmit the request including the identifier list.

Example 2. The apparatus of Example 1, wherein the request comprises a delete request, the processor is configured to include the identifier list in the delete request as a filter for searching the specific records based on the identifier list, and the transceiver is configured to transmit the delete request including the filter.

Example 3. The apparatus of Example 1 or 2, wherein the request comprises a search request, the processor is configured to include, in the search request, a first indication and the identifier list indicating the identifiers associated with the specific records which are to be retrieved from the storage entity, wherein the first indication indicates that, along with a reference list indicating references to retrieved records of the specific records which have been retrieved based on the identifier list, a content of the retrieved records is to be received in a response with respect to the search request; and the transceiver is configured to transmit the search request including the identifier list and the first indication.

Example 4. The apparatus of Example 3, wherein the search request serves to retrieve, from the storage entity, records that match a filter, and wherein the processor is configured to include the identifier list and the first indication as the filter.

Example 5. The apparatus of Example 3 or 4, wherein the processor is configured to set, in the search request, information about a certain payload size of the response.

Example 6. The apparatus of any one of Examples 3 to 5, wherein the processor is further configured to include a second indication in the search request, the second indication indicating that the response with respect to the search request is to be a search result notification according to an asynchronous communication.

Example 7. The apparatus of Example 6, wherein the second indication comprises a callback indicator to be used for sending the search result notification.

Example 8. The apparatus of Example 6 or 7, wherein the processor is further configured to include a third indication in the search request, the third indication indicating that the response with respect to the search request may be multiple search result notifications according to the asynchronous communication in which the content of the retrieved records is contained entirely.

Example 9. The apparatus of any one of Examples 3 to 7, wherein the transceiver is configured to receive the response with respect to the search request, the processor is configured to decide, based on the reference list and the content included in the response, whether or not a condition that a content of each of the records whose reference is indicated in the reference list has been received with the response is met; and in case the condition is not met, include, in a further search request, the first indication and an identifier list indicating identifiers associated with records of the specific records, whose references are included in the reference list of the response but whose identifiers are not included in the content of the response, and the transceiver is configured to transmit the further search request.

Example 10. The apparatus of Example 9, wherein the transceiver is configured to receive a further response with respect to the further search request, the processor is configured to perform deciding, based on the reference list and the content included in the further response and based on the identifiers associated with the retrieved records whose content has been included in the response to the search request which is a previous search request to the further search request, whether or not the condition is met; and in case the condition is not met, including, in a still further search request, the first indication and an identifier list indicating identifiers associated with records of the specific records, whose references are included in the reference list of the further response but whose identifiers are not included in the content of the further response and which have not been received in the response associated with the previous search request, the transceiver is configured to transmit the still further search request, and the processor is configured to repeat the deciding and including until the condition is met.

Example 11. The apparatus of Example 9 or 10, wherein the processor is configured to not include, in the identifier list of the further search request, an identifier associated with a specific record which is not indicated in the reference list of the response.

Example 12. An apparatus for use in a communication system, wherein the apparatus stores data in a plurality of records, the apparatus comprising: a transceiver configured to receive a request including an identifier list indicating identifiers associated with specific records; and a processor configured to process the request based on the identifier list and the plurality of records.

Example 13. The apparatus of Example 12, wherein the request comprises a delete request, the processor is configured to search, from the plurality of records, records whose references match the identifiers indicated in the identifier list using the identifier list as a filter for searching the specific records in the plurality of records, and delete the searched specific records from the plurality of records.

Example 14. The apparatus of Example 12 or 13, wherein the request comprises a search request, the processor is configured to retrieve, from the plurality of records, records whose references match the identifiers indicated in the identifier list, include, in a response with respect to the search request, a reference list indicating the references to the retrieved records, based on a first indication included in the search request with respect to including, into the response, a content of the specific records along with the reference list, include the content or a subset of the content in the response, and the transceiver is configured to transmit the response including the reference list and the content or the subset of the content.

Example 15. The apparatus of Example 14, wherein, in case of several retrieved records, the processor is configured to limit the content to be included into the response to a number of the retrieved records that does not exceed a certain payload size.

Example 16. The apparatus of Example 15, wherein the processor is configured to acquire information about the certain payload size from the search request.

Example 17. The apparatus of any one of Examples 14 to 16, wherein in case the search request includes a second indication indicating that the response with respect to the search request is to be a search result notification according to an asynchronous communication, the processor is configured to prepare a notification message as the response, the notification message including the reference list and the content or the subset of the content, and the transceiver is configured to transmit an acknowledgement of the search request and to transmit the notification message, or the processor is configured to prepare the response as acknowledgment of the search request.

Example 18. The apparatus of Example 17, wherein the second indication comprises a callback indicator and the transceiver is configured to transmit the notification message to the callback indicator.

Example 19. The apparatus of Example 17 or 18, wherein in case the search request includes the second indication and a third indication indicating that the response with respect to the search request may be multiple search result notification, and in case a number of retrieved records exceeds a certain payload size, the processor is configured to prepare several notification messages including the reference list and the subset of the content, and the transceiver is configured to transmit the several notification messages.

Example 20. A method for use in a communication system, the method comprising: including, in a request towards a storage entity storing data in a plurality of records, an identifier list indicating identifiers associated with specific records to be processed; and transmitting the request including the identifier list.

Example 21. The method of Example 20, wherein the request comprises a delete request, the identifier list is included in the delete request as a filter for searching the specific records based on the identifier list, and the delete request including the filter is transmitted.

Example 22. The method of Example 20 or 21, wherein the request comprises a search request, in the search request, a first indication and the identifier list indicating the identifiers associated with the specific records which are to be retrieved from the storage entity are included, wherein the first indication indicates that, along with a reference list indicating references to retrieved records of the specific records which have been retrieved based on the identifier list, a content of the retrieved records is to be received in a response with respect to the search request, and the search request including the identifier list and the first indication is transmitted.

Example 23. The method of Example 22, wherein the search request serves to retrieve, from the storage entity, records that match a filter, and wherein the identifier list and the first indication are included as the filter.

Example 24. The method of Example 22 or 23, further comprising: setting, in the search request, information about a certain payload size of the response.

Example 25. The method of any one of Examples 22 to 24, further comprising: including a second indication in the search request, the second indication indicating that the response with respect to the search request is to be a search result notification according to an asynchronous communication.

Example 26. The method of Example 25, wherein the second indication comprises a callback indicator to be used for sending the search result notification.

Example 27. The method of Example 25 or 26, further comprising: including a third indication in the search request, the third indication indicating that the response with respect to the search request may be multiple search result notifications according to the asynchronous communication in which the content of the retrieved records is contained entirely.

Example 28. The method of any one of Examples 22 to 26, further comprising: receiving the response with respect to the search request; deciding, based on the reference list and the content included in the response, whether or not a condition that a content of each of the records whose reference is indicated in the reference list has been received with the response is met; in case the condition is not met, including, in a further search request, the first indication and an identifier list indicating identifiers associated with records of the specific records, whose references are included in the reference list of the response but whose identifiers are not included in the content of the response; and transmitting the further search request.

Example 29. The method of Example 28, further comprising: receiving a further response with respect to the further search request; deciding, based on the reference list and the content included in the further response and based on the identifiers associated with the retrieved records whose content has been included in the response to the search request which is a previous search request to the further search request, whether or not the condition is met; in case the condition is not met, including, in a still further search request, the first indication and an identifier list indicating identifiers associated with records of the specific records, whose references are included in the reference list of the further response but whose identifiers are not included in the content of the further response and which have not been received in the response associated with the previous search request; transmitting the still further search request; and repeating the deciding and including until the condition is met.

Example 30. The method of Example 28 or 29, further comprising: refraining from including, in the identifier list of the further search request, an identifier associated with a specific record which is not indicated in the reference list of the response.

Example 31. A method for use by an apparatus of a communication system, wherein the apparatus stores data in a plurality of records, the method comprising: receiving a request including an identifier list indicating identifiers associated with specific records; and processing the request based on the identifier list and the plurality of records.

Example 32. The method of Example 31, wherein the request comprises a delete request, and the method further comprises searching, from the plurality of records, records whose references match the identifiers indicated in the identifier list using the identifier list as a filter for searching the specific records in the plurality of records, and deleting the searched specific records from the plurality of records.

Example 33. The method of Example 31 or 32, wherein the request comprises a search request, and the method further comprises: retrieving, from the plurality of records, records whose references match the identifiers indicated in the identifier list, including, in a response with respect to the search request, a reference list indicating the references to the retrieved records, based on a first indication included in the search request with respect to including, into the response, a content of the specific records along with the reference list, including the content or a subset of the content in the response; and transmitting the response including the reference list and the content or the subset of the content.

Example 34. The method of Example 33, wherein, in case of several retrieved records, the content to be included into the response is limited to a number of the retrieved records that does not exceed a certain payload size.

Example 35. The method of Example 34, further comprising: acquiring information about the certain payload size from the search request.

Example 36. The method of any one of Examples 33 to 35, further comprising: in case the search request includes a second indication indicating that the response with respect to the search request is to be a search result notification according to an asynchronous communication, preparing a notification message as the response, the notification message including the reference list and the content or the subset of the content; transmitting an acknowledgement of the search request and transmitting the notification message, or preparing the response as acknowledgment of the search request.

Example 37. The method of Example 36, wherein the second indication comprises a callback indicator and the notification message is transmitted to the callback indicator.

Example 38. The method of Example 36 or 37, wherein in case the search request includes the second indication and a third indication indicating that the response with respect to the search request may be multiple search result notification, and in case a number of retrieved records exceeds a certain payload size, several notification messages including the reference list and the subset of the content are provided, and the several notification messages are transmitted.

Example 39. A non-transitory computer-readable storage medium storing a program that, when executed by a computer, causes the computer at least to perform: including, in a request towards a storage entity storing data in a plurality of records, an identifier list indicating identifiers associated with specific records to be processed; and transmitting the request including the identifier list.

Example 40. A non-transitory computer-readable storage medium storing a program that, when executed by a computer of an apparatus of a communication system, the apparatus storing data in a plurality of records, causes the computer at least to perform: receiving a request including an identifier list indicating identifiers associated with specific records; and processing the request based on the identifier list and the plurality of records.

It is to be understood that the above description is illustrative and is not to be construed as limiting. Various modifications and applications may occur to those skilled in the art without departing from the scope as defined by the appended claims.

The invention claimed is:

1. An apparatus comprising:
at least one processor; and
at least one memory storing instructions of a consumer network function for a communication network, the instructions, when executed by the at least one processor, causing the apparatus at least to:
include, in a search request for a storage entity implementing an unstructured data storage function and storing data in a plurality of records, a first indication and an identifier list,
wherein the identifier list indicates identifiers associated with specific records which are to be retrieved from among the plurality of records stored by the storage entity,
wherein the first indication indicates that, along with a reference list indicating references to retrieved records of the specific records which have been retrieved based on the identifier list, a content of the retrieved records is to be received in a response with respect to the search request;
transmit the search request including the identifier list and the first indication;
receive the response with respect to the search request;
decide, based on the reference list and the content included in the response, whether or not a condition that a respective content of each of the records that have a respective reference indicated in the reference list has been received with the response is met; and
based on deciding the condition is not met:
include, in a further search request, the first indication and another identifier list, wherein the another identifier list indicates identifiers associated with records of the specific records that have a respective reference indicated in the reference list of the response but do not have a respective identifier included in the content of the response; and
transmit the further search request.

2. The apparatus of claim 1, wherein the instructions, when executed by the at least one processor, further cause the apparatus to:
include another identifier list in a delete request as a filter for searching the plurality of records for another specific records based on the another identifier list, and
transmit the delete request including the another identifier list.

3. The apparatus of claim 1, wherein the search request is configured to retrieve, from the storage entity, the specific records of the plurality of records that match a filter, and wherein the filter includes the identifier list and the first indication.

4. The apparatus of claim 1, wherein the instructions, when executed by the at least one processor, further cause the apparatus to set, in the search request, information about a payload size of the response.

5. The apparatus of claim 1, wherein the instructions, when executed by the at least one processor, further cause the apparatus to include a second indication in the search request, the second indication indicating that the response with respect to the search request is to be a search result notification according to an asynchronous communication.

6. The apparatus of claim 5, wherein the second indication comprises a callback indicator to be used for sending the search result notification.

7. The apparatus of claim 5, wherein the instructions, when executed by the at least one processor, further cause the apparatus to include a third indication in the search request, the third indication indicating that the response with respect to the search request may be multiple search result notifications according to the asynchronous communication in which content of the retrieved records of the response may be split over the multiple search result notifications.

8. The apparatus of claim 1, wherein the instructions, when executed by the at least one processor, further cause the apparatus to:
receive a further response with respect to the further search request;
decide, based on the reference list and the content included in the further response and based on the identifiers associated with the retrieved records whose content has been included in the response to the search request which is a previous search request to the further search request, whether or not another condition that a respective content of each of the records that have a respective reference indicated in the reference list of the further response has been received with the further response is met; and
when the another condition is not met:
include, in a still further search request, the first indication and a still further identifier list, wherein the still further identifier list indicates identifiers associated with records of the specific records that have a respective reference indicated in the reference list of the further response but that do not have an identifier included in the content of the further response and which have not been received in the response associated with the previous search request; and
transmit the still further search request.

9. The apparatus of claim 1, wherein the instructions, when executed by the at least one processor, further cause the apparatus to not include, in the identifier list of the further search request, an identifier associated with a specific record which is not indicated in the reference list of the response.

10. A method of a consumer network function for a communication network, the method comprising:

including, in a search request towards a storage entity implementing an unstructured data storage function and storing data in a plurality of records, a first indication and an identifier list, wherein the identifier list indicates identifiers associated with specific records which are to be retrieved from among the plurality of records stored by the storage entity, wherein the first indication indicates that, along with a reference list indicating references to retrieved records of the specific records which have been retrieved based on the identifier list, a content of the retrieved records is to be received in a response with respect to the search request;

transmitting the search request including the identifier list and the first indication;

receiving the response with respect to the search request;

deciding, based on the reference list and the content included in the response, a condition that a respective content of each of the records that have a respective reference indicated in the reference list has been received with the response is not met;

including, in a further search request, the first indication and another identifier list, wherein the another identifier list indicates identifiers associated with records of the specific records that have a respective reference indicated in the reference list of the response but do not have a respective identifier included in the content of the response; and transmitting the further search request.

11. The method of claim 10, further comprising:
including another identifier list in a delete request as a filter for searching the plurality of records for another specific records based on the another identifier list, and transmitting the delete request including the another identifier list.

12. The method of claim 10, wherein the search request is configured to retrieve, from the storage entity, the specific records of the plurality of records that match a filter, and wherein the filter includes the identifier list and the first indication.

13. The method of claim 10, further comprising:
setting, in the search request, information about a payload size of the response.

14. The method of claim 10, further comprising:
including a second indication in the search request, the second indication indicating that the response with respect to the search request is to be a search result notification according to an asynchronous communication.

15. The method of claim 14, wherein the second indication comprises a callback indicator to be used for sending the search result notification.

16. The method of claim 14, further comprising:
including a third indication in the search request, the third indication indicating that the response with respect to the search request may be multiple search result notifications according to the asynchronous communication in which content of the retrieved records of the response may be split over the multiple search result notifications.

17. The method of claim 10, further comprising:
receiving a further response with respect to the further search request;

decide, based on the reference list and the content included in the further response and based on the identifiers associated with the retrieved records whose content has been included in the response to the search request which is a previous search request to the further search request, whether or not another condition that a respective content of each of the records that have a respective reference indicated in the reference list of the further response has been received with the further response is met; and based on deciding the another condition is not met:
including, in a still further search request, the first indication and a still further identifier list, wherein the still further identifier list indicates identifiers associated with records of the specific records that have a respective reference indicated in the reference list of the further response but that do not have an identifier included in the content of the further response and which have not been received in the response associated with the previous search request; and transmitting the still further search request.

18. The method of claim 10, further comprising:
abstaining from including, in the identifier list of the further search request, an identifier associated with a specific record which is not indicated in the reference list of the response.

19. A non-transitory computer-readable medium storing instructions of a consumer network function, which when executed by an apparatus, cause the apparatus to perform:
including, in a search request towards a storage entity implementing an unstructured data storage function and storing data in a plurality of records, a first indication and an identifier list, wherein the identifier list indicates identifiers associated with specific records which are to be retrieved from among the plurality of records stored by the storage entity, wherein the first indication indicates that, along with a reference list indicating references to retrieved records of the specific records which have been retrieved based on the identifier list, a content of the retrieved records is to be received in a response with respect to the search request;

transmitting the search request including the identifier list and the first indication;

receiving the response with respect to the search request;

deciding, based on the reference list and the content included in the response, whether or not a condition that a respective content of each of the records that have a respective reference indicated in the reference list has been received with the response is met;

determining the condition is not met;

including, in a further search request, the first indication and another identifier list, wherein the another identifier list indicates identifiers associated with records of the specific records that have a respective reference indicated in the reference list of the response but do not have a respective identifier included in the content of the response; and transmitting the further search request.

* * * * *